United States Patent [19]
Hibino et al.

[11] Patent Number: 5,649,246
[45] Date of Patent: Jul. 15, 1997

[54] INFORMATION PROCESSING DEVICE AND METHOD

[75] Inventors: Hideo Hibino; Hisashi Okutsu; Norikazu Yokonuma, all of Kanagawa-ken; Kazuyuki Kazami, Tokyo-to, all of Japan

[73] Assignee: Nikon Corporation, Tokyo, Japan

[21] Appl. No.: 544,293

[22] Filed: Oct. 17, 1995

[30] Foreign Application Priority Data

Oct. 26, 1994 [JP] Japan .................................. 6-262278

[51] Int. Cl.⁶ .......................... G03B 17/24; G03B 1/18
[52] U.S. Cl. .......................... 396/310; 396/319; 396/387
[58] Field of Search ........................... 354/106; 396/310, 396/319, 387

[56] References Cited

U.S. PATENT DOCUMENTS

| | | | |
|---|---|---|---|
| 5,124,735 | 6/1992 | Tsukahara et al. | 354/106 |
| 5,247,321 | 9/1993 | Kazami | 354/106 |
| 5,450,149 | 9/1995 | Cocca | 354/106 |
| 5,481,323 | 1/1996 | Egawa et al. | 354/106 |
| 5,493,355 | 2/1996 | Kazami | 354/106 |
| 5,504,546 | 4/1996 | Kazami et al. | 354/106 |
| 5,508,767 | 4/1996 | Kazumi et al. | 354/106 |

*Primary Examiner*—Michael L. Gellner
*Assistant Examiner*—Daniel Chapik
*Attorney, Agent, or Firm*—Oliff & Berridge

[57] ABSTRACT

An information processing device, such as a camera, capable of magnetically recording information on film, controls magnetic recording and film feeding using a single position detector that detects film position information, such as perforations in the film. After a frame of the film has been photographically exposed, the information processing device first feeds the film in a reverse direction opposite to the direction of advancement, before accelerating the film forward in the advancement direction to a stable advancement velocity. The usable length of the magnetic recording area of the film is thus increased because recording does not take place while film velocity is changing.

24 Claims, 10 Drawing Sheets

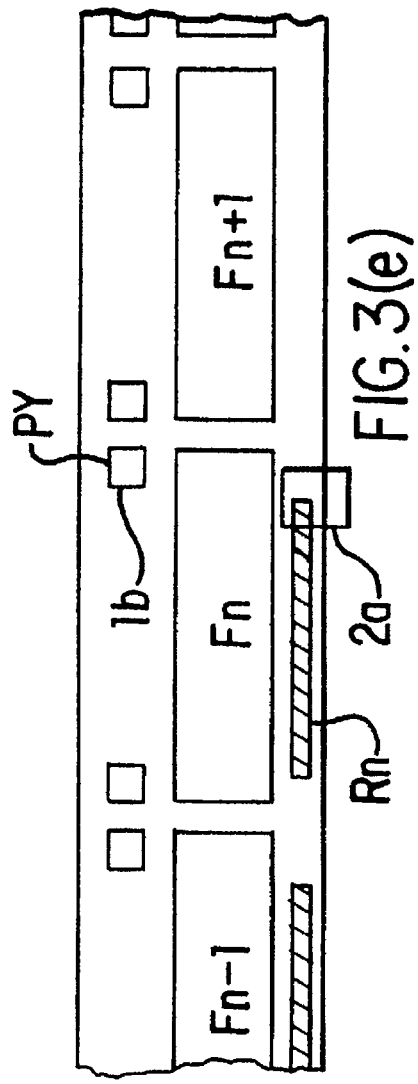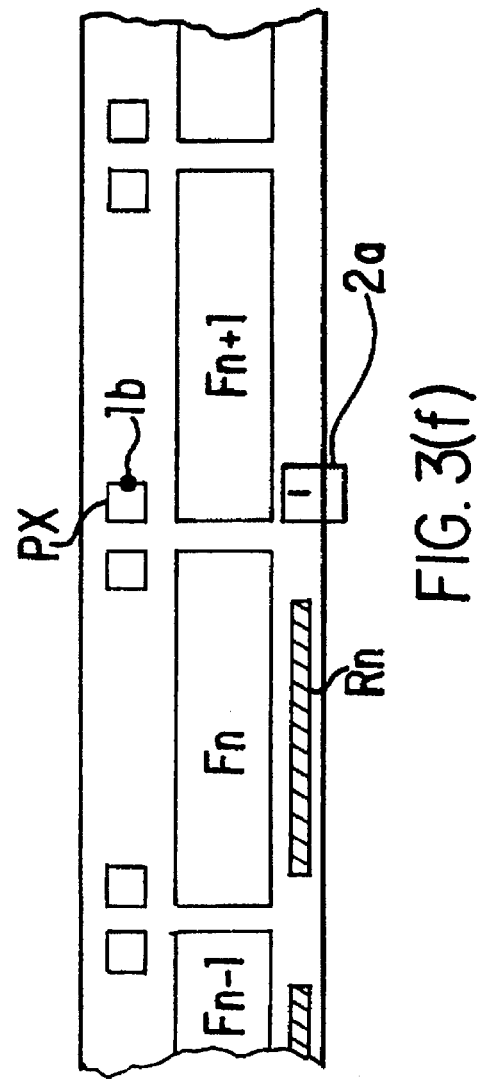

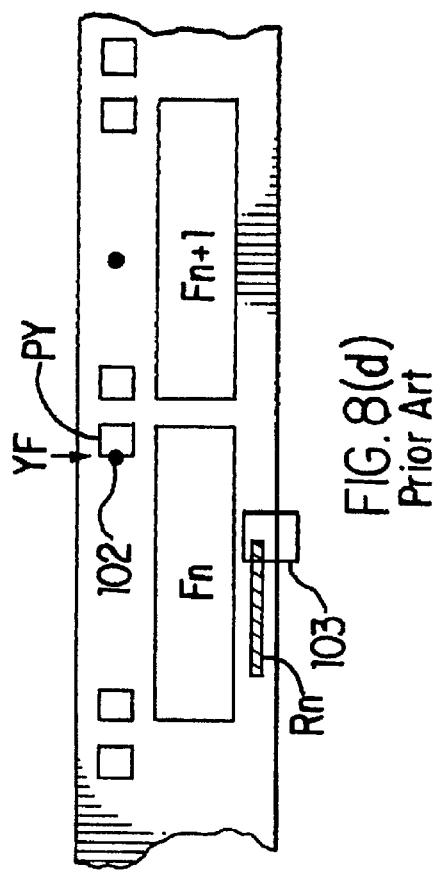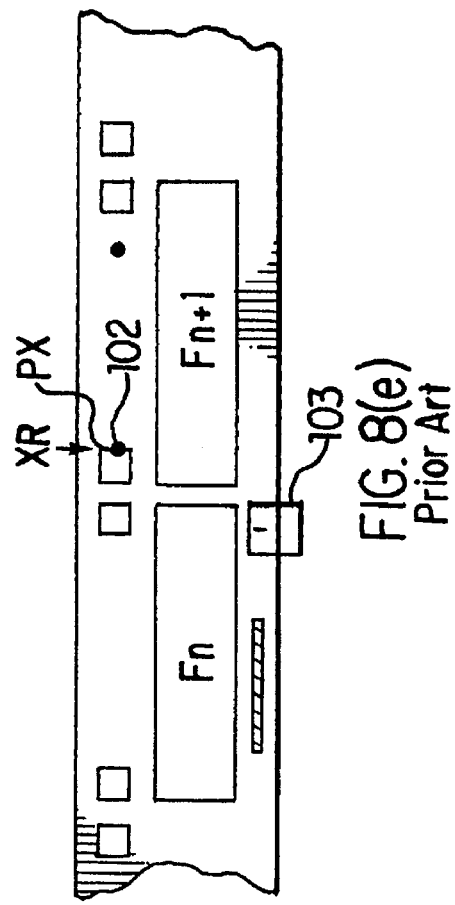

INFORMATION PROCESSING DEVICE AND METHOD

BACKGROUND OF THE INVENTION

1. Field of the Invention

The present invention relates to magnetically recording information. More particularly, this invention relates to an information processing device, such as a camera that magnetically records information onto a magnetic recording part of a film.

2. Description of Related Art

Cameras are known that use a film with a magnetic recording part. Such a camera typically has two perforation detectors that detect perforations in the film. A frequency of recording and a timing for commencement of magnetic recording are determined based upon a perforation detection signal from the first perforation detector. A timing for termination of magnetic recording and a timing for termination of feeding the film are determined based upon a perforation detection signal from the second perforation detector. See, for example, published unexamined Japanese patent application Hei 4 (1992) - 328536.

FIG. 7 indicates a relationship between a position of a photo-interrupter and a magnetic head of a conventional camera capable of magnetic recording. FIG. 7 shows a film 100 with a magnetic recording part used in the camera, wherein the film 100 is positioned facing the camera aperture.

In addition, the camera is of the so-called normal wind type. In a normal wind type camera, frames of film are withdrawn from the film cartridge and exposed one by one. After all of the frames have been exposed, the film is then wound back into the film cartridge.

A film advance spool (not shown) is provided on the left side of FIG. 7. It is assumed that a film cartridge chamber (not shown) exists on the right side of FIG. 7. Therefore, the film 100 advances in a direction to the left of FIG. 7, and rewinds in a direction to the right of FIG. 7. Also, the leader of the film 100 (not shown) is on the left side of FIG. 7.

On one side of the film 100, two perforations are provided for each photographic frame. One of the two perforations PX is located on the advance spool side of any photographic frame Fn (n=1, 2, ... ). The other of the two perforations PY is located on the film cartridge chamber side of the photographic frame Fn.

Emulsion is applied on one surface of the film 100 for image recording, and a magnetic recording medium is applied on the other surface of the film 100 for magnetic recording. A magnetic recording area Rn (n=1, 2, ... ) is thereby established for each photographic frame Fn.

The camera has a perforation detection circuit with two photo-interrupters (not shown). Detection position 101 of the first photo-interrupter and detection position 102 of the second photo-interrupter are established as shown in FIG. 7 so that the position 101 is closer than the position 102 to the film cartridge chamber, and the position 102 is closer than the position 101 to the advance spool. In addition, a magnetic head 103 is established at a position nearer to the advance spool than to the film cartridge chamber, as shown in FIG. 7.

Borders CX and CY separate the photographic frame Fn from adjacent frames Fn−1 and Fn+1. The border CX is located on a side of the photographic frame Fn adjacent the advance spool, and the border CY is located on a side of the photographic frame Fn adjacent the film cartridge chamber.

For any photographic frame Fn, the perforation PX has an edge XF nearest the advance spool and an edge XR nearest the film cartridge chamber. Additionally, the perforation PY has an edge YF nearest the advance spool and an edge YR nearest the film cartridge chamber.

FIG. 7 shows distances L1 through L7. L1 is the distance between the borders CX and CY separating the film frames. L2 is the distance from the edge YF of the perforation PY of the photographic frame Fn−1 to the edge XR of the perforation PX of the photographic frame Fn. When the photographic frame Fn is at the specified photographic position, L3 is the distance between the detection position 101 and the edge YR of the perforation PY.

L4 is the distance between the recording center of the magnetic head 103 and the border CX. L5 is the distance from a) an end of the magnetic recording range Rn nearest to the advance spool, to b) the border CX. L6 is the length of the magnetic recording range Rn of each photographic frame Fn measured from a) the edge of the magnetic recording range Rn nearest to the advance spool, to b) the edge of the magnetic recording range Rn nearest to the film cartridge chamber. L7 is the distance between the edge of the magnetic recording range Rn nearest to the film cartridge chamber and the border CY.

The magnetic recording operation of a conventional camera capable of magnetic recording will now be described with reference to FIG. 8.

When the edge XR of the perforation PX of any photographic frame Fn (n=1, 2, ... ) is at the detection position 102 of the second photo-interrupter, the frame is in a specified photographic position. The frame is photographically exposed while in the specified photographic position.

FIG. 8 (a) shows photographic frame Fn in the specified photographic position. After exposure of the frame Fn is completed, advancement of the film 100 commences.

As shown in FIG. 8 (b), the edge YF of the perforation PY passes the detection position 101 of the first photo-interrupter as the film 100 is advanced.

After the edge YF has passed the detection position 101, the film 100 continues to advance and the edge YR of the perforation PY passes the detection position 101. See FIG. 8 (c).

A timer determines the length of time between the time the edge YF passes the detection position 101 and the time the edge YR passes the detection position 101. The speed of the film advancement is then determined based upon the length of time determined by the timer and the distance between the edges YF and YR of the perforation PY. The frequency of magnetic recording is then determined according to the determined film advancement speed so that the specified density of magnetic recording can be obtained. Subsequently, the magnetic head 103 commences magnetic recording.

Next, when the edge YF of the perforation PY passes the detection position 102 of the second photo-interrupter as shown in FIG. 8 (d), the magnetic head 103 ceases magnetic recording, and the film advancement motor commences reducing the film advancement speed to zero.

When the edge XR of the perforation PX of the next photographic frame Fn+1 is at the detection position 102 of the second photo-interrupter as shown in FIG. 8 (e), advancement of the film 100 is terminated, and frame Fn+1 is in the specified photographic position.

However, problems exist with the conventional camera capable of magnetic recording as described above. First, the film advancement speed is unstable during periods of time after a photographic frame has been exposed and before the next photographic frame is in position for exposure.

Specifically, the film advancement speed is unstable as the film 100 is accelerated to a stable advancement velocity after taking a picture, and again as the film 100 is decelerated to zero velocity to complete the advancement. During these time periods magnetic recording is not performed because the speed of the film advancement is not constant.

As a result, the effective magnetic recording area for each photographic frame is shortened by the length of magnetic recording area that passes by the magnetic head 103 while the film 100 is either accelerating or decelerating.

In addition, with a conventional camera capable of magnetic recording, two perforation detectors are used to control magnetic recording on the film 100 and to control advancement of the film 100. Thus, mounting space for both perforation detectors must be provided. Other cost-related considerations also exist.

SUMMARY OF THE INVENTION

An object of the present invention is to provide a camera capable of magnetic recording that obtains a sufficiently large magnetic recording area for each photographic frame.

A second objective of the present invention is to provide a device capable of magnetic recording that controls magnetic recording and film advancement using a single perforation detector, thereby minimizing space necessary for installation and placement of the perforation detector, and reducing manufacturing costs.

In order to accomplish these and other objectives, a device capable of magnetic recording is provided that includes a film feeding device that moves the film in forward and reverse directions, a single detection device that detects information relating to the position of the film (such as the occurrence of a perforation in the film), a recording device that magnetically records various kinds of information on the film, and a control device that controls the film feeding device to feed the film based upon information provided by the detection device.

Alternatively, the single detecting device could for example detect information relating to the position of the film by detecting magnetic position indicators on the film.

After a photographic frame has been exposed and before the film has been advanced to move the next photographic frame forward into a specified position for photographic exposure, the control device first causes the film to be fed in a reverse direction, opposite to the forward direction of advancement.

The control device then causes the film to be advanced in the forward direction. Since the film is fed in a reverse direction and then accelerated to a stable forward speed before the exposed photographic frame moves again into the specified photographic position, magnetic recording may commence the instant the exposed photographic frame is in the specified photographic position and may continue until deceleration of the film commences. Various kinds of information are magnetically recorded on the film as the film is advanced in the forward direction.

As a result, the effective magnetic recording area for each photographic frame is larger in a device utilizing the present invention than in the conventional camera capable of magnetic recording.

The device of the present invention also uses information provided by the detection device to determine the frequency at which information is magnetically recorded on the film, the timing for the process of magnetically recording information on the film, and the timing for properly feeding the film. In this way, magnetic recording and film feeding are controlled based on information provided by the single detection device.

BRIEF DESCRIPTION OF THE DRAWINGS

The invention will be described in detail with reference to the following drawings in which like reference numerals refer to like elements and wherein:

FIGS. 3(a)-(f) show magnetic recording operations according to the first embodiment;

DETAILED DESCRIPTION OF PREFERRED EMBODIMENTS

This invention is directed to any device capable of magnetic recording on a film. For purposes of illustration, the invention is described as applied to a camera.

Figure 1:
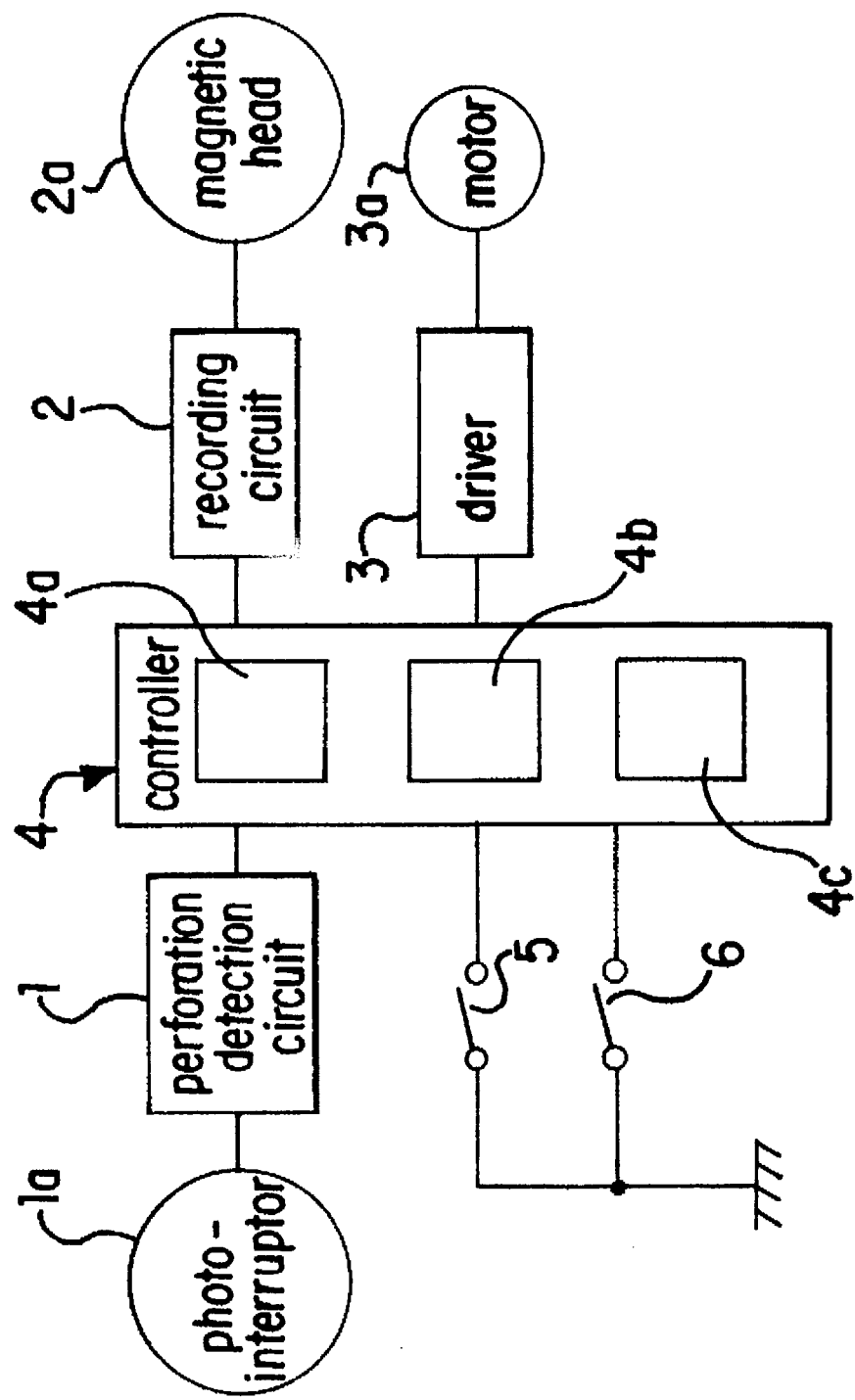
FIG. 1 is a schematic block diagram of a device according to the first embodiment of the present invention.

A functional block diagram of a first embodiment of a device, such as a camera, capable of magnetic recording according to the present invention is shown in FIG. 1.

Figure 2:
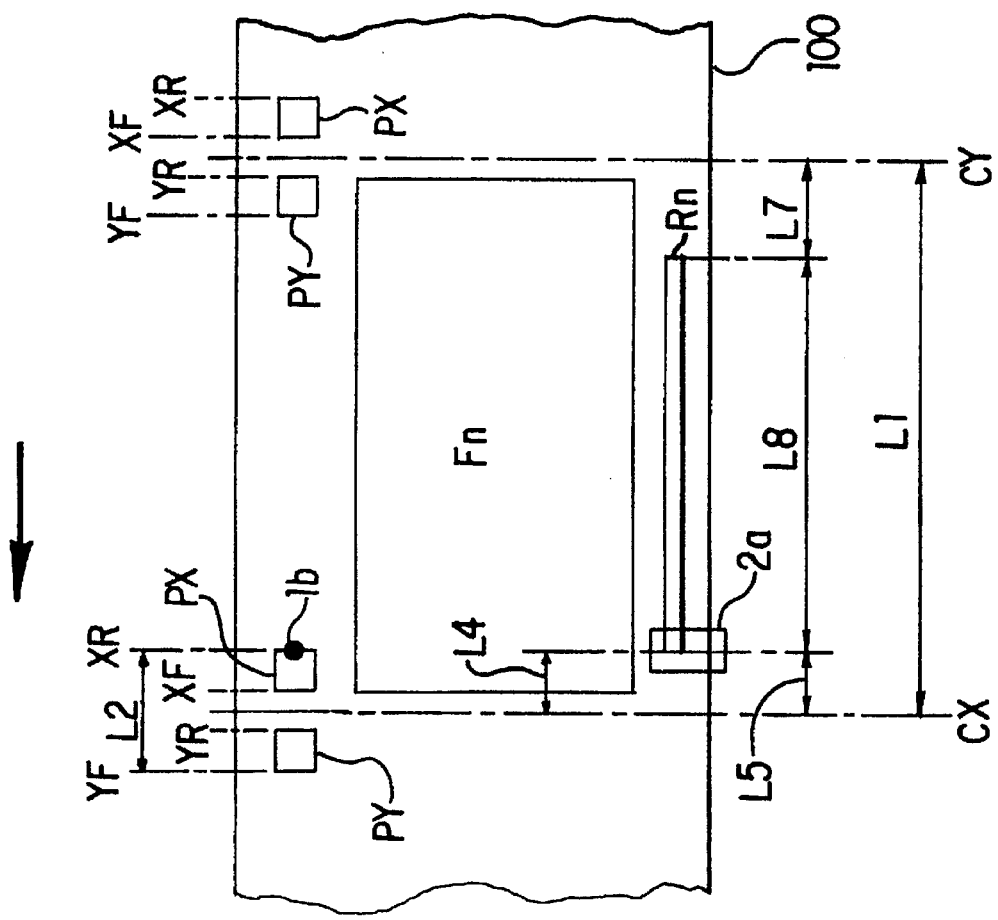
FIG. 2 is a diagram showing the positional relationships between a photographic interrupter, a magnetic head of a device capable of magnetic recording, and a film used in the device.
Figure 3A:
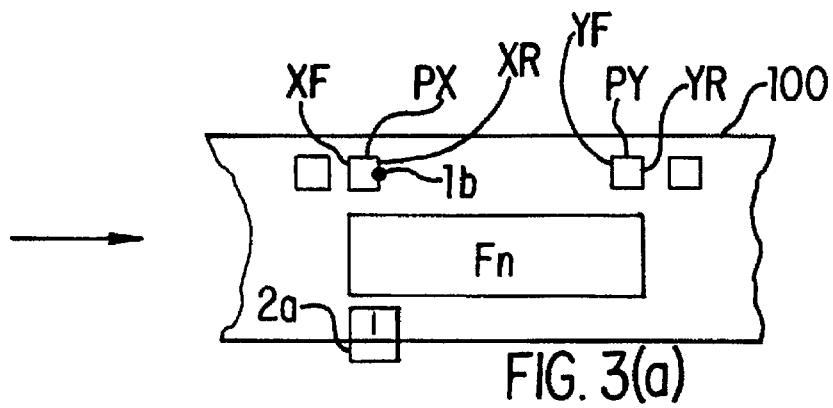
Figure 3B:
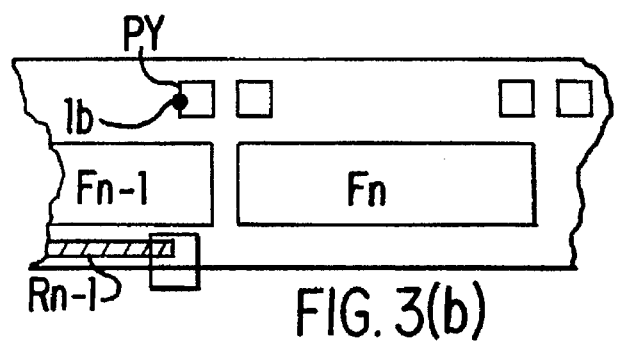
Figure 3C:
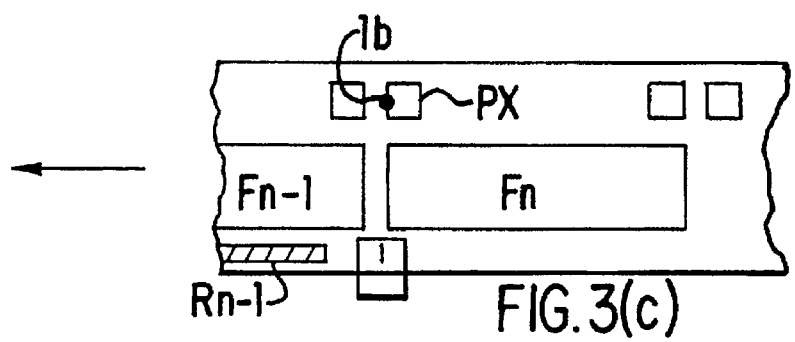
Figure 3D:
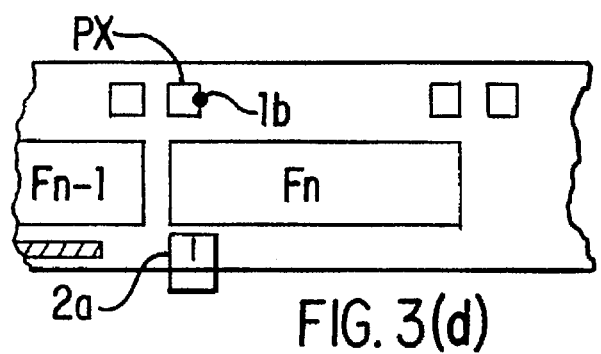

According to the first embodiment shown in FIGS. 1 and 2, a perforation detection circuit 1 detects a perforation of a film 100 using a photo-interrupter 1a. A recording circuit 2 uses a magnetic head 2a to magnetically record various kinds of information in the magnetic recording area of the film 100. A driver 3 advances and rewinds the film 100 via a film feeding motor 3a. A controller 4 includes a) a recording control section 4a for controlling magnetic recording by the recording circuit 2, b) a film feed control section 4b for controlling film feeding by the driver 3, and c) a calculation section 4c for determining the magnetic recording frequency, the magnetic recording timing, and the film feed timing. The controller sections 4a, 4b and 4c perform their respective functions based on information provided by the perforation detection circuit 1. A main switch 5 is actuated to put the camera in an operational state, and a release switch 6 turns ON when a release button (not shown in FIG. 1) is released.

In the illustrated embodiments, the controller may be implemented as a single special purpose integrated circuit (e.g., ASIC) having a main or central processor section for overall, system-level control, and separate sections dedicated to performing various different specific computations, functions and other processes under control of the central processor section. Those skilled in the art will appreciate that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices containing a finite state machine capable of implementing the flowcharts shown in FIGS. 5–6 can be used as the controller. As shown in FIG. 1, a distributed processing architecture is preferred for maximum data/signal processing capability and speed.

FIG. 2 shows the preferred positional relationships between the photo-interrupter 1a and the magnetic head 2a of the device of the first embodiment, and the film 100 used in the device.

Figure 7:
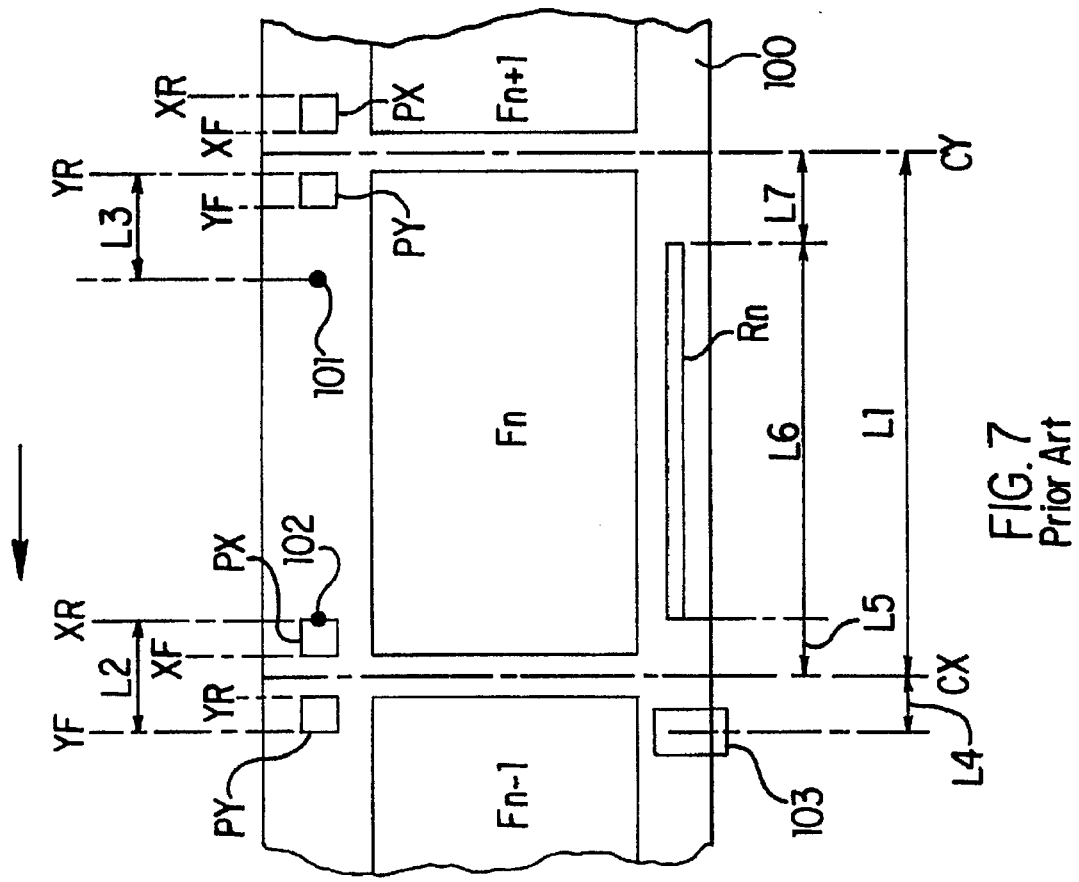
FIG. 7 is a prior art diagram showing positional relationships between a photo-interrupter and a magnetic head of a conventional camera capable of magnetic recording and a film used in the camera.

The film 100 shown in FIG. 2 is similar to the film 100 shown in FIG. 7, and explanations of its dimensions and other characteristics are therefore omitted. In addition, the symbols described above with regard to FIG. 7 have identical application in FIG. 2.

The symbol 1b (shown in FIG. 2) indicates the detection position of the photo-interrupter 1a. In the first embodiment, the perforations PX, PY in the film 100 are detected by a detection device comprising a photo-interrupter 1a and a perforation detection circuit 1.

A film advance spool (not shown) is provided on the left side of FIG. 7, and a film cartridge chamber (not shown) exists on the right side of FIG. 7. Also, the magnetic head 2a is established on the right side of the border CX, at the distance L4 from the border CX. The particular left and right hand orientations are shown for purposes of illustration. It will be readily recognized by one of ordinary skill in the art that the orientations can be varied.

The magnetic recording operation in the first embodiment is described hereafter with reference to FIG. 3.

FIG. 3 (a) shows the photographic frame Fn located at the specified position for exposure. When exposure of the photographic frame Fn is completed, film rewind commences, and the film 100 is moved in a reverse direction, opposite to the direction of advancement.

Movement of the film 100 in the reverse direction is terminated when the edge YF of the perforation PY of a previous photographic frame Fn−1 passes the detection position 1b of the photo-interrupter as shown in FIG. 3 (b).

Next, film advancement commences, and the film 100 is moved in a forward direction. After the film 100 has been accelerated to a stable forward velocity, a timer measures time that elapses from the moment the edge XF of the perforation PX of the photographic frame Fn passes the detection position 1b of the photo-interrupter (as shown in FIG. 3 (c)), until the moment the edge XR passes the detection position 1b of the photo-interrupter. The elapsed time is used along with the known length from the edge XF to the edge XR of the perforation PX to calculate the film feeding speed. The frequency of magnetic recording is then calculated based on the calculated film feeding speed and a specified magnetic recording density, and the magnetic head 2a commences magnetically recording.

Next, as shown in FIG. 3 (e), when the edge YF of the perforation PY of the photographic frame Fn passes the detection position 1b of the photo-interrupter 1a, magnetic recording terminates, and the film feeding motor commences decelerating the film 100 to zero velocity.

When the edge XR of the perforation PX of the next photographic frame Fn+1 is at the detection position 1b of the photo-interrupter 1a as shown in FIG. 3 (f), feeding of the film 100 is terminated, and the next photographic frame Fn+1 is in the specified photographic position.

The length L8 of the magnetic recording area Rn according to the magnetic recording operation of the first embodiment is described hereafter.

The position at which magnetic recording commences, as shown in FIG. 3 (d), is a position where the edge XR of the perforation PX of the frame Fn is at the detection position 1b, the position being substantially equivalent to the specified photographic position of the photographic frame Fn.

It is possible to commence magnetic recording at this position because, after each exposure, the film 100 is rewound and then accelerated forward in the advancement direction to a stable velocity, so that the film advance velocity is stable by the time the exposed photographic frame Fn passes back through the specified photographic position. Therefore, magnetic recording may commence the instant the exposed photographic frame Fn passes through the specified photographic position.

Accordingly, the position of the magnetic head 2a at the time when the photographic frame Fn is advancing through the specified photographic position is also the position of the front edge of the magnetic recording area Rn.

In order for the position of the magnetic head 2a to match the position of the front edge of the film's magnetic recording area Rn when magnetic recording commences according to the first embodiment of the present invention, L5 must equal L4, as shown in FIG. 2. L5 is the distance from the front edge of the magnetic recording area Rn to the border CX, and L4 is the distance from the center of the magnetic head 2a to the border CX.

The relative position of the magnetic recording area Rn for each photographic frame Fn is freely decided by changing the position of the magnetic head 2a, but the length L8 of the magnetic recording area does not change.

L1 is the space of each photographic frame, as shown in FIG. 2. L1 is also the length of film 100 fed between completion of exposure of any photographic frame Fn and the establishment of the next photographic frame Fn+1 at the specific photographic position.

Deceleration of the film 100 commences after the photographic frame Fn has been moved forward through the specified photographic position and continues until the film 100 comes to rest at zero velocity with the next photographic frame Fn+1 in the specified photographic position. During this deceleration, a length L2 of the film 100 moves past the magnetic head 2a. Since magnetic recording does not take place during acceleration or deceleration of the film 100, the length L8 of the magnetic recording area Rn in this embodiment is calculated by subtracting the length L2 from the space L1 of the photographic frame Fn:

$$L8 = L1 - L2 \quad (1)$$

Figure 8A:
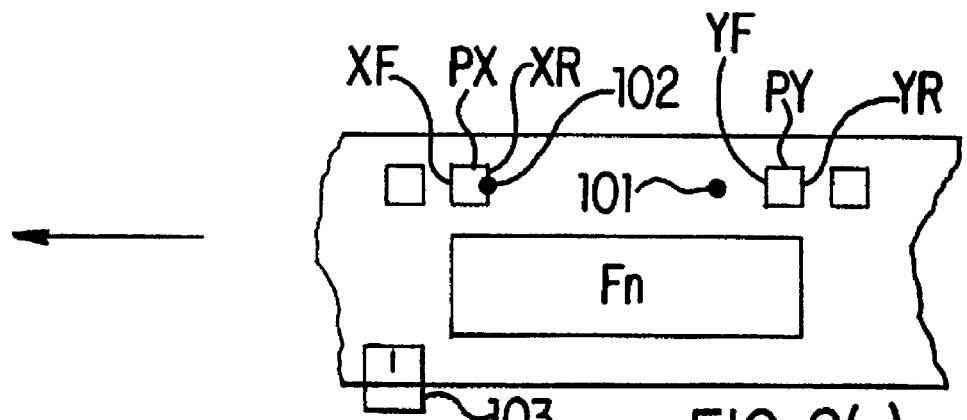
FIG. 8 is a prior art illustration showing the magnetic recording operation of a conventional camera capable of magnetic recording.
Figure 8B:
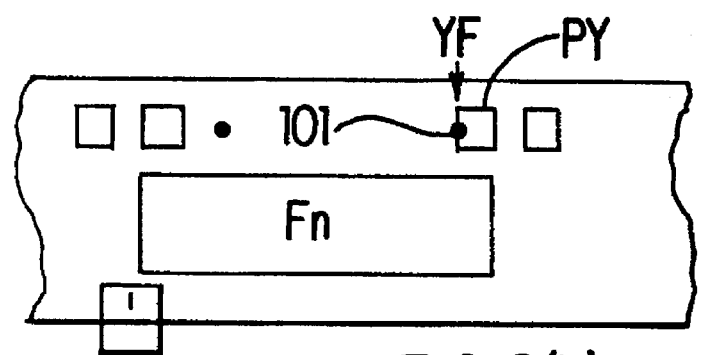
Figure 8C:
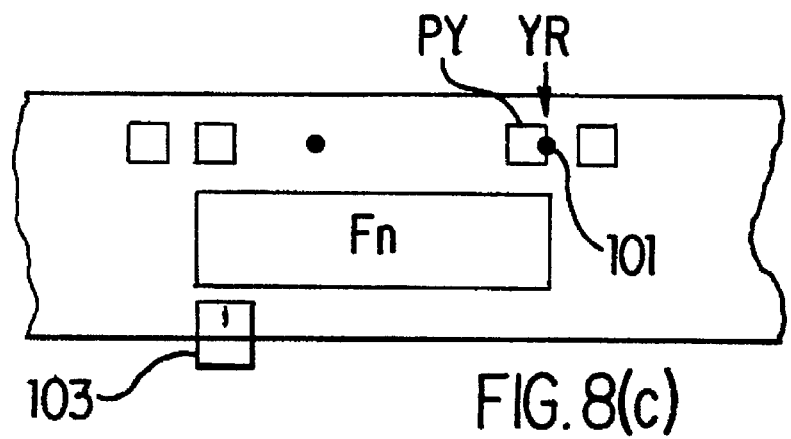

The length L6 of the magnetic recording area Rn of each photographic frame of the conventional camera capable of magnetic recording shown in FIGS. 7 and 8, is described hereafter.

In the conventional camera, after completion of exposure of any photographic frame Fn, advancement of the next frame Fn+1 into the specified photographic position comprises three stages. In the first stage, the film 100 is accelerated forward in the advancement direction to a stable forward velocity. In the second stage, while the film 100 is moving forward at a stable velocity, magnetic recording takes place. In the third stage, the film 100 is decelerated from the stable forward velocity to zero velocity so that the next photographic frame Fn+1 comes to rest in the specified photographic position. Magnetic recording does not take place in the first and third stages. From the beginning of the first stage until the end of the third stage, the film 100 moves forward the distance L1, the space of the photographic frame Fn. During the first stage, a length L3 of film 100 moves past the magnetic recording head 103. During the third stage, a length L2 of film 100 moves past the magnetic recording head 103. Accordingly, the length L6 of the magnetic recording area Rn in the conventional camera is:

$$L6=L1-L2-L3 \qquad (2)$$

Specifically, the space L1 is the distance between the borders CX and CY shown in FIG. 7. Also, the length of film 100 fed as the film 100 is accelerated forward in the advancement direction and then stabilized at a constant velocity during stage 1, is the distance L3, which extends from the detection position 101 of the first photo-interrupter to the edge YR of the perforation PY, as shown in FIG. 8 (a). The length L2 extends from the edge YF of the perforation PY of the photographic frame Fn to the edge PX of the perforation PX of the photographic frame Fn+1. See FIGS. 8 (d) and 8 (e).

Accordingly, since the length L8 of the magnetic recording area Rn of the first embodiment is (L1–L2), while the length L6 of the magnetic recording area Rn as used in the conventional camera is (L1–L2–L3), the length L8 is greater than the length L6 by the distance L3.

Figure 4A:
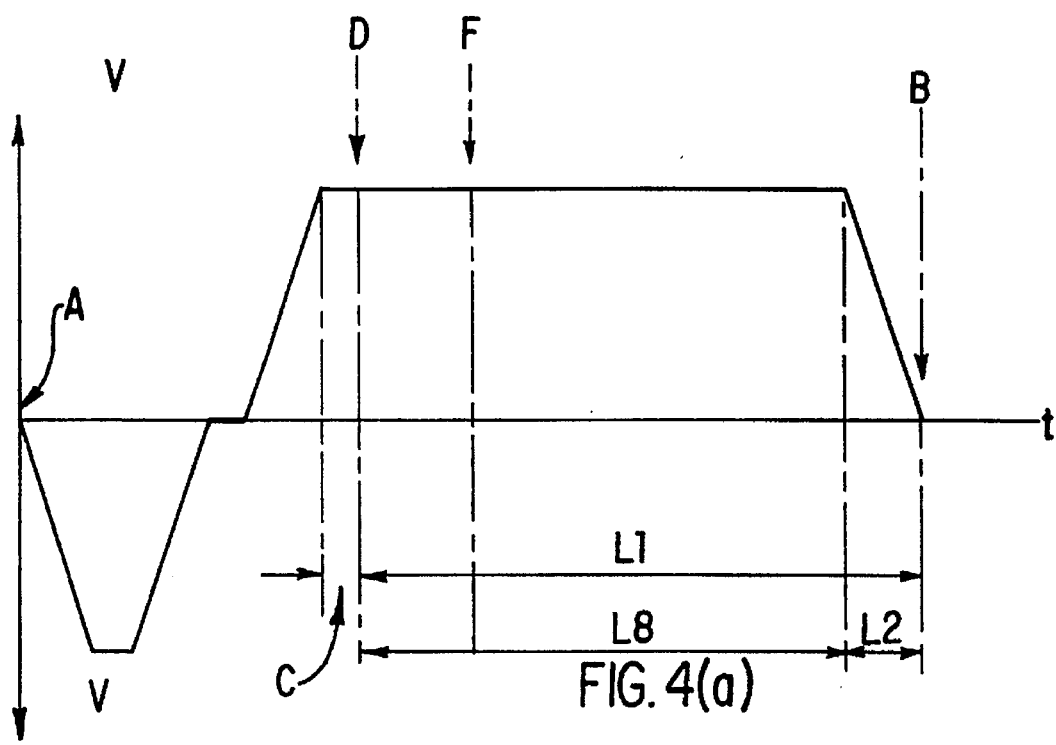
FIGS. 4(a)-(b) are time charts showing film feed speed after exposure.
Figure 4B:
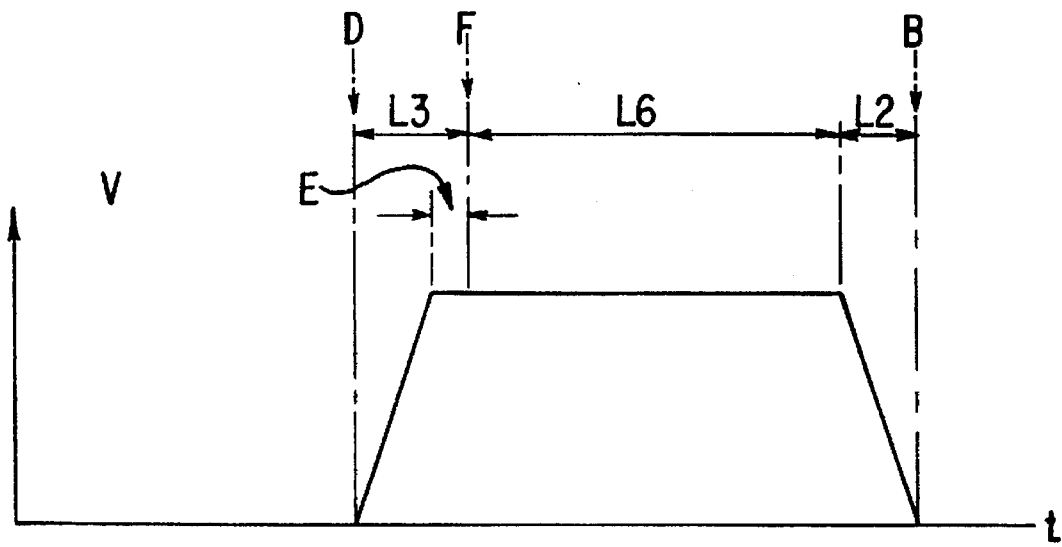

The lengths L6 and L8 are hereafter described with reference to FIG. 4. FIG. 4 is a time chart showing the velocity, or speed and direction of feeding of the film 100 after exposure, wherein (a) illustrates the case of the first embodiment, and (b) illustrates the case of the conventional device. The symbols A and D indicate the time points when the photographic frame Fn is at the specified photographic position, and the symbol B indicates the time point when the next photographic frame Fn+1 is at the specified photographic position.

As shown in FIG. 4 (a), in the first embodiment, when the exposure of the photographic frame Fn at the specified photographic position is completed, rewinding of the film 100 commences at the time point A, before winding the film 100 in the direction of advancement. Winding to advance the next photographic frame Fn+1 into the specified photographic position is accomplished thereafter.

Winding in the first embodiment is divided into three stages. In the first stage, the film 100 is accelerated forward in the advancement direction to a stable forward velocity. In the second stage, while the film 100 is moving forward at a stable velocity, magnetic recording takes place. In the third stage, the film 100 is decelerated from the stable forward velocity to zero velocity so that the next photographic frame Fn+1 comes to rest in the specified photographic position. Because the feeding speed changes enormously in the first and third stages, magnetic recording does not take place during the first and third stages.

Immediately after the film 100 moves from a state of acceleration to a constant forward velocity state, the speed of the film 100 is detected during the time period C. This speed is used to determine the recording frequency. Magnetic recording then commences at the time point D at which the photographic frame Fn passes through the specified photographic position.

Magnetic recording can be continued until the film feeding motor commences deceleration of the film 100 to zero velocity. At the time point B, feeding of the film 100 is terminated, and the next photographic frame Fn+1 is at rest in the specified photographic position. Accordingly, the length L8 of the magnetic recording area Rn is the difference between the lengths L1 and L2, as shown in FIG. 4 (a).

In addition, the length L8 can be further increased by modifying the third stage so that deceleration of the film 100 to zero velocity commences at the same time or after the photographic frame Fn+1 is in the specified photographic position, so that frame Fn+1 moves forward in the advancement direction past the specified photographic position before coming to rest. The film is then rewound in the direction opposite to the advancement direction and stopped to bring the frame Fn+1 to rest in the specified photographic position. Thus the length L2 may also be used so that the length L8 of the magnetic recording area Rn is the same as the length L1.

In the conventional device, as shown in FIG. 4 (b), when the exposure of the photographic frame Fn at the specified photographic position is complete, winding immediately commences at the time point D. Immediately after the film 100 moves from a state of acceleration to a constant forward velocity state, the speed of the film 100 is detected during the time period E. This speed is used to determine the recording frequency, and magnetic recording then commences at the time point F.

In the conventional device, magnetic recording can be continued until the film feeding motor commences deceleration of the film 100 to zero velocity. At the time point B, feeding of the film 100 is terminated, and the next photographic frame Fn+1 is at rest in the specified photographic position.

The length L6 of the magnetic recording area Rn is the length L1 less the sum of the lengths L2 and L3, as shown in FIG. 4 (b), and the length L8 is therefore greater than the length L6 by the length L3.

As will be recognized by one of ordinary skill in the art, the desired length L8 of the magnetic recording area Rn can easily be adjusted by varying the position of the film perforations and detecting different edges of the perforations or by adding additional perforations spaced from perforations PX toward the film cartridge, for example.

Figure 5:
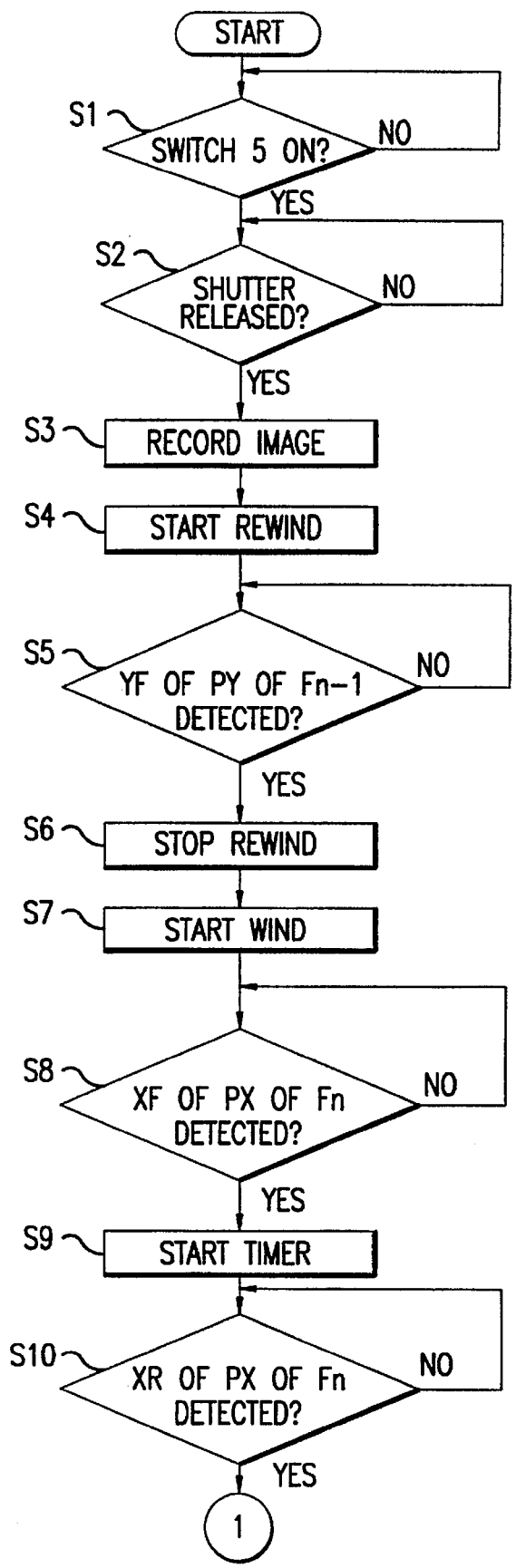
FIG. 5 is a flow chart showing a first part of a method for controlling magnetic recording according to this invention.
Figure 6:
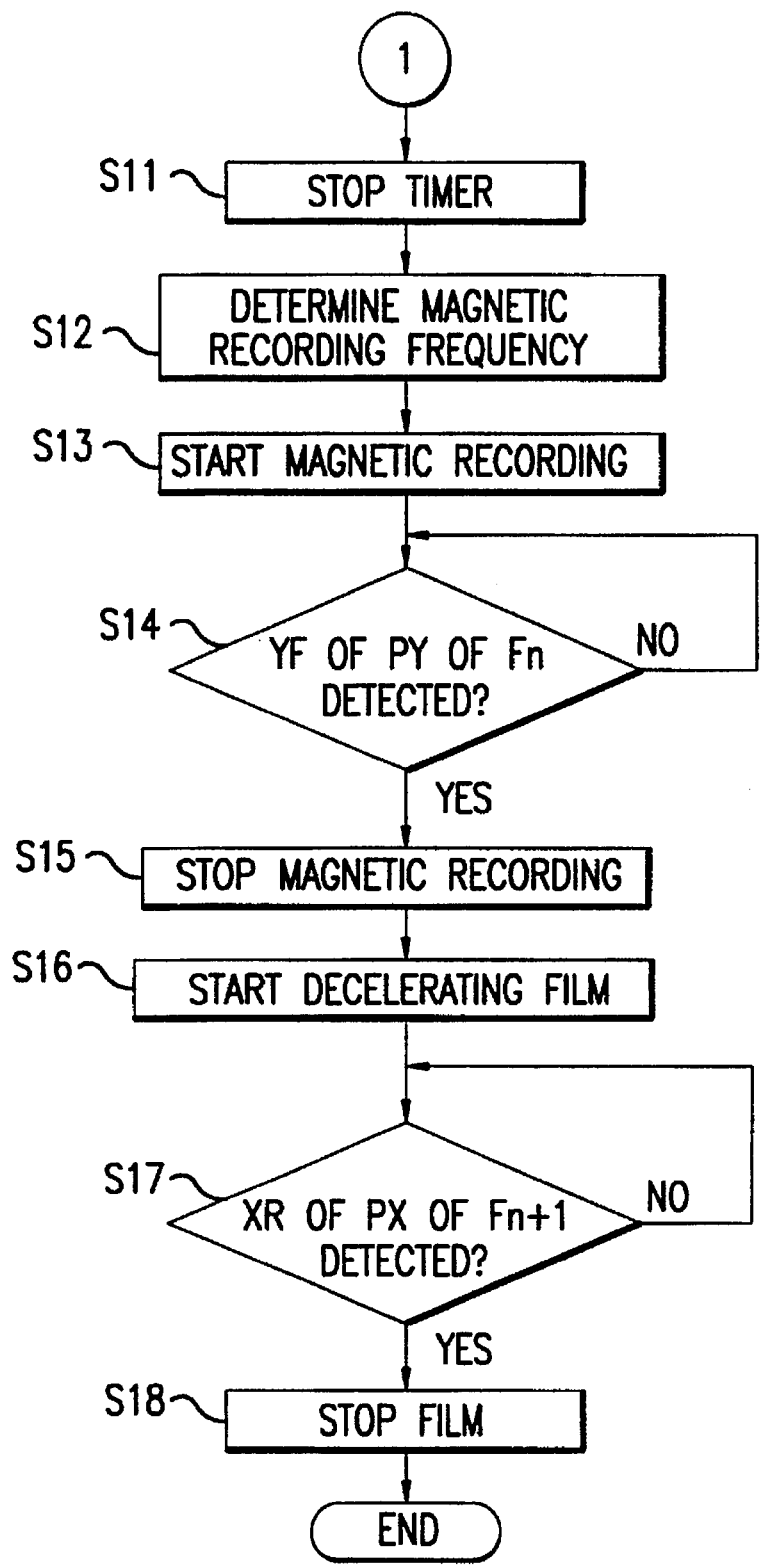
FIG. 6 is a flow chart showing a second part of the method for controlling magnetic recording, continuing from FIG. 5.

FIGS. 5 and 6 are flow charts showing a control method for use in the first embodiment.

At step S1, if the main switch 5 is ON, then the process advances to step S2. In step S2, a determination is made whether the shutter has been released by the release switch 6. If the shutter has been released, step S3 is executed. In step S3 exposure of the photographic frame at the specified photographic position is completed through related photographic operations, such as actuating the exposure control, mirror drive, and shutter drive. After the exposure is complete, step S4 is executed.

In step S4 the motor 3a is driven by controlling the driver 3 to commence rewinding the film 100 in the reverse direction, opposite to the advancement direction. In step S5 a determination is made whether the edge YF of the perforation PY of the previous photographic frame Fn−1 is detected by the perforation detection circuit 1. When the edge YF is detected, step S6 is executed. In step S6, rewinding of the film 100 is terminated by the driver 3 via the drive of the motor 3a.

In step S7, the motor 3a is reversed by the driver 3, so that advancement of the film 100 commences. Next, in step S8, a determination is made whether the edge XF of the perforation PX of the photographic frame Fn has been detected by the perforation detection circuit 1. When the edge XF is detected, step S9 is executed, and the timer is started.

In step S10, a determination is made whether the edge XR of the perforation PX of the photographic frame Fn is detected by the perforation detection circuit 1. When the edge XR is detected, step S11 is executed, and the timer is stopped.

In step S12, the recording frequency is calculated as described previously. In step S13, the recording circuit 2 causes the magnetic head 2a to commence magnetically recording information onto the film 100. In step S14, a determination is made whether the edge YF of the perforation PY of the photographic frame Fn has been detected by the perforation detection circuit 1. When the edge YF is detected, step S15 is executed.

In step S15, the memory circuit 2 causes the magnetic head 2a to cease magnetically recording. In step S16, the driver 3 causes the motor 3a to commence deceleration of the film 100 to zero velocity.

In step S17, a determination is made whether the edge XR of the perforation PX of the next photographic frame Fn+1 has been detected by the perforation detection circuit 1. When the edge XR is detected, step S18 is executed. In step S18, the driver 3 causes the motor 3a to bring the film 100 to zero velocity and thereby terminate feeding of the film 100.

In the first embodiment, the present invention is applied to a camera of the so-called normal wind type. In the normal wind type camera, film is advanced out of the film cartridge frame by frame as each frame is exposed. After all the frames have been exposed, the frames are then rewound back into the film cartridge.

In a second embodiment, the present invention is applied to a camera of the so-called pre-wind type. In the pre-wind type of camera, all of the film is unwound from the film cartridge and wound onto the film advance spool before any of the photographic frames are exposed. As each photographic frame is exposed, the exposed photographic frame is advanced back into the film cartridge.

The structure of the second embodiment is similar to that of the first embodiment in several respects. The driver 3 and the motor 3a compose the feeding assembly; the perforation detection circuit 1 and the photo-interrupter 1a compose the detection mechanism; the recording circuit 2 and the magnetic head 2a compose the recording mechanism; and the controller 4 having sections 4a, 4b and 4c composes the control assembly.

The configuration of the first embodiment is modified slightly to create the configuration of the second embodiment. Specifically, the detection position 1b of the photo-interrupter 1a and the position of the magnetic head 2a, both shown located in FIG. 2 on the side of the photographic frame nearest the advance spool (not shown), are moved to corresponding locations on the side of the photographic frame nearest to the film cartridge chamber (not shown). In effect the positions 1b and 2a of the first and second embodiments are reversed, because the film advancement directions are reversed. In addition, parts of the control method shown in FIGS. 5 and 6 are changed appropriately.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. An information processing device for recording images on a film having frames comprising:

feeding means for feeding the film in a feed path;

film position detection means for detecting position information relating to a position of the film in the feed path;

recording means for magnetically recording information on the film; and control means for controlling the feeding means and the recording means based on the detected position information from the film position detection means, wherein the control means comprises a) feed control means for controlling feeding of the film by the feeding means based upon the position information detected by the film position detection means, and b) recording control means for controlling magnetic recording by the recording means, so that after an image is recorded on a frame of the film, the film is fed so that the next movement of the film is in a first direction, and is then fed continuously in a second direction opposite to the first direction to feed a next, unexposed frame of film into a recording position for recording an image, wherein a) information is magnetically recorded on the film while the film is fed continuously in the second direction, b) the next, unexposed frame of film is moved in the second direction into the recording position, and c) the continuous movement of the film in the second direction is consecutive with the movement of the film in the first direction.

2. The information processing device according to claim 1, wherein the control means further comprises a determining means for determining a frequency at which magnetic recording will occur, a timing for magnetic recording, and a timing for feeding the film, based upon the position information detected by the film position detection means.

3. The information processing device according to claim 1, wherein the film position detection means detects a perforation in the film.

4. The information processing device according to claim 1, wherein the information processing device is a camera.

5. The information processing device according to claim 4, wherein the camera is a normal wind type of camera wherein the film is advanced from a film cartridge upon recording of an image.

6. The information processing device according to claim 4, wherein the camera is a pre-wind type of camera wherein the film is unwound prior to recording images and then rewound into a film cartridge upon recording of an image.

7. The information processing device according to claim 1, wherein the film position detection means is one photo-interrupter disposed in the feed path.

8. The information processing device according to claim 1, wherein the film position detection means detects a first point in a first film frame for image recording, detects a second point in an adjacent film frame to start film feeding to advance to a second frame for image recording, and detects a third point located at the first point in the first film frame to start magnetic recording in the first film frame.

9. The information processing device according to claim 1, wherein the control means controls the recording means to magnetically record information on the film only when the feeding means is feeding the film at a constant velocity.

10. An information processing device comprising:
a film feed that feeds a film in a feed path;
a film position detector located in the feed path that detects position information relating to a position of the film;
a magnetic information recorder located in the feed path that magnetically records information on the film; and
a controller coupled to the film feed, the film position detector, and the magnetic information recorder, wherein the controller controls the film feed to feed the film based upon the position information detected by the film position detector, and controls the magnetic information recorder to magnetically record on the film in a magnetic information recording area, wherein each time an image is recorded on a frame of the film at a recording position the film feed feeds the film from the recording position in a first direction, and then continuously feeds the film in a second direction opposite to the first direction during which the magnetic information recorder magnetically records information on the film, so that the continuous feeding of the film in the second direction is consecutive with the feeding of the film from the recording position in the first direction.

11. The information processing device according to claim 10, wherein the controller determines a frequency for magnetic recording, a timing for magnetic recording, and a timing for feeding the film, based upon the position information provided by the film position detector.

12. The information processing device according to claim 10, wherein the controller determines a frequency for magnetic recording, a timing for magnetic recording, and a timing for feeding the film, based upon the position information provided by the film position detector while the film feed feeds the film in the second direction.

13. The information processing device according to claim 10, wherein the film position detector detects an edge of a perforation in the film.

14. The information processing device according to claim 10, wherein the film position detector is one photo interrupter.

15. The information processing device according to claim 10, wherein the information processing device is a camera.

16. The information processing device according to claim 15, wherein the camera is a normal wind type.

17. The information processing device according to claim 15, wherein the camera is a pre-wind type.

18. An information processing method for recording information on a film, comprising the steps of:
recording an image on a current frame of film while the current frame is in a recording position;
with the current frame beginning in the exposure position, feeding the film in a first direction after recording the image on the current frame of film;
feeding the film continuously in a second direction opposite to the first direction until a next, unexposed frame of film is in the recording position; and
recording information magnetically on the film while feeding the film in the second direction, wherein the feeding of the film continuously in the second direction is consecutive with the feeding of the film in the first direction.

19. The information processing method according to claim 18, wherein the step of feeding the film in the second direction comprises:

accelerating the film in the second direction to a constant velocity;
maintaining the constant velocity for a period of time; and
decelerating the film to zero velocity so that a next frame of film is positioned in the recording position.

20. The information processing method according to claim 19, wherein the step of recording information magnetically on the film while feeding the film in the second direction further comprises:
measuring the magnitude of the constant velocity after the film is accelerated to the constant velocity;
determining at least one of a magnetic recording frequency, a magnetic recording timing, and a film feed timing based upon the measured magnitude of the constant velocity;
magnetically recording information on the film during the period of time that the constant velocity is maintained based on the determined at least one of the magnetic recording frequency, the magnetic recording timing, and the film feed timing; and
ceasing to magnetically record information on the film before deceleration of the film to zero velocity commences.

21. The information processing method according to claim 20, wherein the step of measuring the magnitude of the constant velocity employs a film position detector, first and second film position indicators in the film separated by a known distance, a timer, and a controller, and comprises:
starting the timer when the first film position indicator passes the film position detector;
stopping the timer when the second film position indicator passes the film position detector to obtain an elapsed time between detection of the first and second film position indicators; and
using the controller to determine the constant velocity of the film based on the elapsed time and the known distance between the first and second film position indicators.

22. The information processing method according to claim 21, wherein the film position detector detects the first film position indicator as a first edge of a perforation in the film and the second film position indicator as a second edge of the perforation in the film.

23. An information processing method for recording information on a film, wherein the film has a plurality of frames, each one of the plurality of frames containing a first perforation and a second perforation, the direction from the first perforation to the second perforation being a specified direction, each of the first and second perforations containing a first edge and a second edge, the direction from the first edge to the second edge being the same as the specified direction, the distance between the first and second edges of each perforation being a known distance, and the method comprising the sequential steps of:
providing a timer, a controller, a film position detector, a film feed, and film disposed in the film feed, wherein a current frame of film is in a specified position for recording an image on the current frame of film;
beginning with the current frame in the specified position, feeding the film in the specified direction;
stopping the film when the film position detector detects the first edge of the second perforation of a previous frame;
accelerating the film to a constant velocity in a direction opposite to the specified direction;

starting the timer when the film position detector detects the first edge of the first perforation of the current frame;

stopping the timer when the film position detector detects the second edge of the first perforation of the current frame, thereby obtaining an elapsed time between detection of the first and second edges of the first perforation of the current frame;

using the controller to calculate a magnetic recording frequency based on the elapsed time and the known distance between the first and second edges of the first perforation of the current frame;

commencing magnetic recording of information on the film using the calculated magnetic recording frequency;

ceasing to magnetically record information on the film when the film position detector detects the first edge of the second perforation of the current frame;

commencing to decelerate the film using the film feed; and stopping the film using the film feed when the film position detector detects the second edge of the first perforation of a next frame so that the next frame is at rest in the specified position for recording an image, wherein;

the film remains at the constant velocity in the direction opposite to the specified direction between the step of accelerating the film to a constant velocity in a direction opposite to the specified direction and the step of commencing to decelerate the film using the film feed.

24. An information processing method for recording information on a film, wherein the film has a plurality of frames, the method comprising the sequential steps of:

providing a film feed, and film disposed in the film feed, wherein a current, exposed frame of film is in a specified position for recording an image on the current frame of film;

beginning with the current frame in the specified position, feeding the film in a specified direction for a predetermined distance;

stopping the film;

accelerating the film to a constant velocity in a direction opposite to the specified direction so that the film is at the constant velocity before the current frame passes through the specified position and remains at the constant velocity until after the current frame has passed through the specified position, wherein magnetic recording of information on the film commences after the film has attained the constant velocity;

ceasing to magnetically record information on the film;

commencing to decelerate the film using the film feed; and stopping the film using the film feed so that the film comes to rest with a next, unexposed frame of film in the specified position for recording an image.

* * * * *